7262X
J. H. SCHRADER.
MACHINE FOR CUTTING ENDLESS SCREWS.
Patented Oct. 25, 1832.
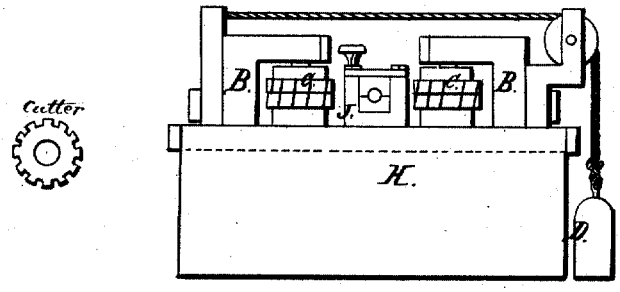
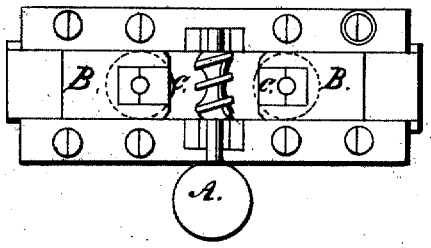
THE NORRIS PETERS CO., PHOTO-LITHO., WASHINGTON, D. C.

X7262 Oct. 25, 1832 567

John H. Schrader of Philadelphia Pennsylvania

Letters Patent

The Schedule referred to in these Letters Patent and making part of the same containing a description in the words of the said John H. Schrader himself of his improvement in the machine for cutting endless screws.

To all to whom these presents shall come. Be it known that I John H. Schrader of the City of Philadelphia and State of Pennsylvania have invented a new and useful machine for cutting endless screws and that the following is a full and exact description of the construction and operation of the said machine as invented by me The machine consists, first, of a square piece of iron (H) made perfectly level on the surface: upon which a piece of steel (I) is fastened in the middle, so worked as to receive the piece of metal (A) on which the screw is to be cut, the remainder of the surface is taken up by two slides (B.B.) which are provided with steel rollers (C C) fastened upon pivots and propelled towards each other by the cord & weights (D) Pieces of metal, properly prepared are alternatively put into the machine & turned round by a crank or other means, whilst the rollers or revolving cutters are pressed against them until the screw is finished. Right and left hand screws may be cut by this principle, of any dimensions. If however the threads of the screw be very coarse, it will be necessary to begin them in the ordinary way, and to put them into the machine to finish them

What I claim as ~~new and my~~ own invention or discovery in the above described machine and for the use of which I ask an exclusive privilege are the revolving cutters or dies

Cpd.

Witnesses
Alex. Robb
Wm. S. Young

John H. Schrader (324 words)